Jan. 31, 1967     G. PASQUETTI     3,300,812
MACHINE FOR MANUFACTURING FLEXIBLE TUBING
Filed June 14, 1965     6 Sheets-Sheet 6
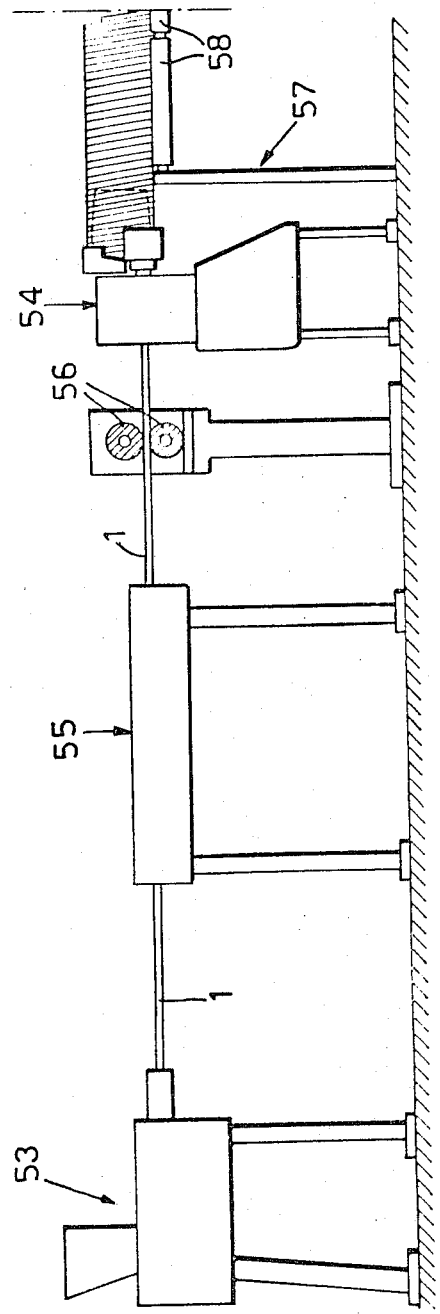

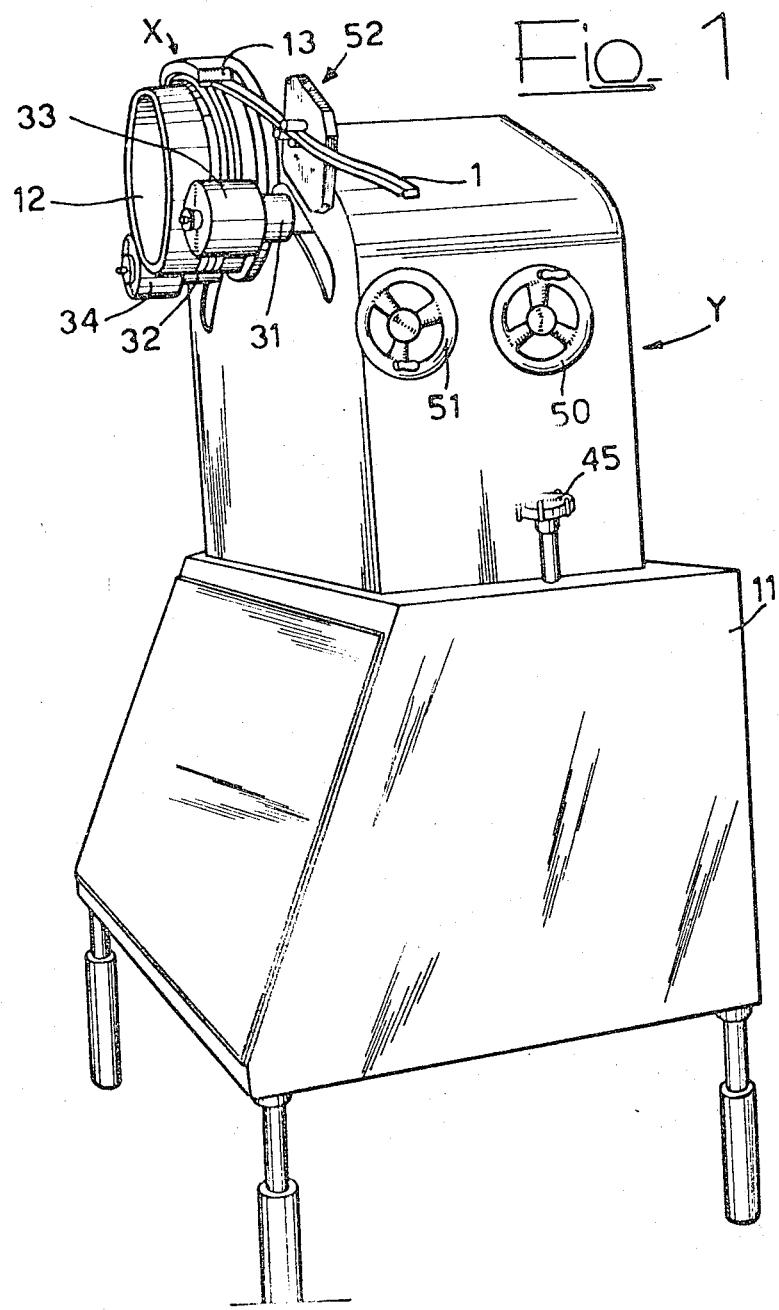

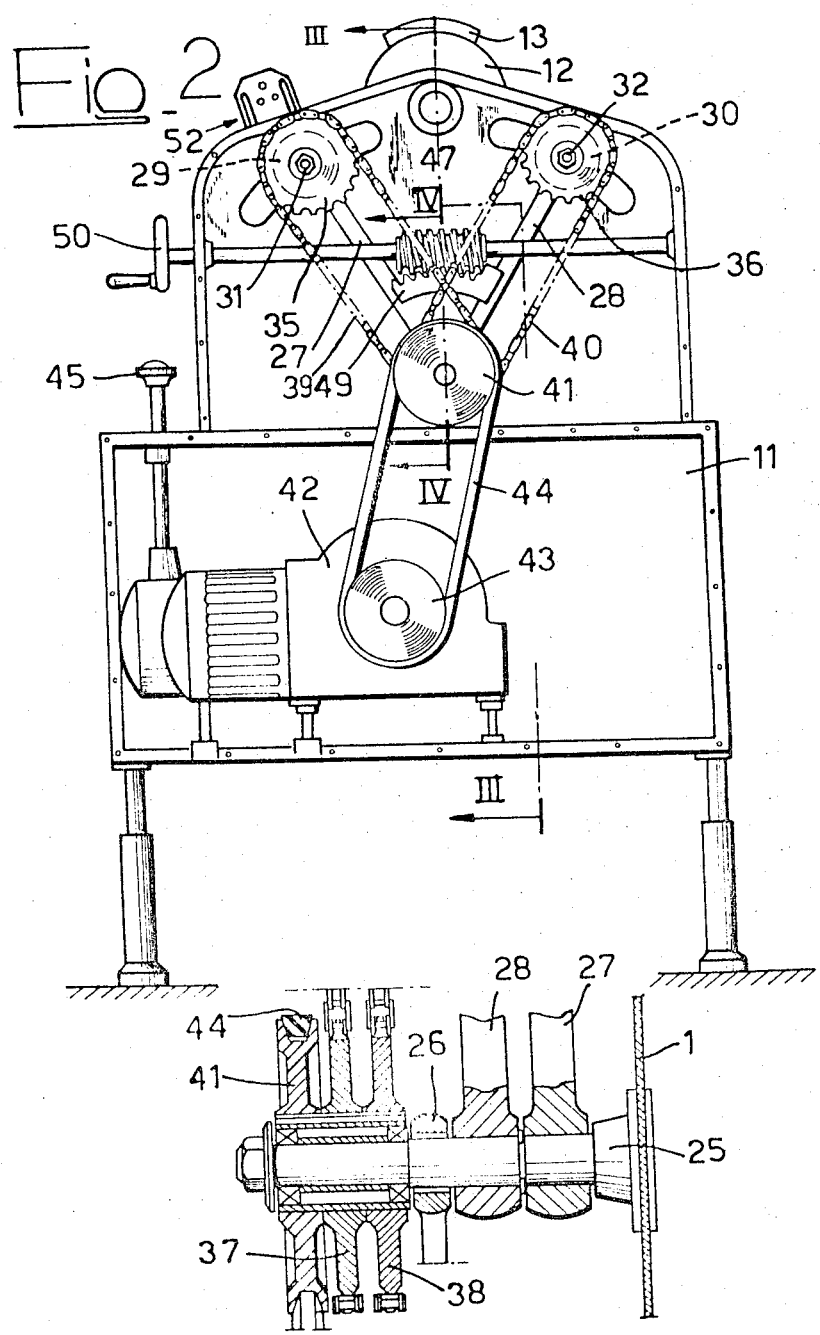

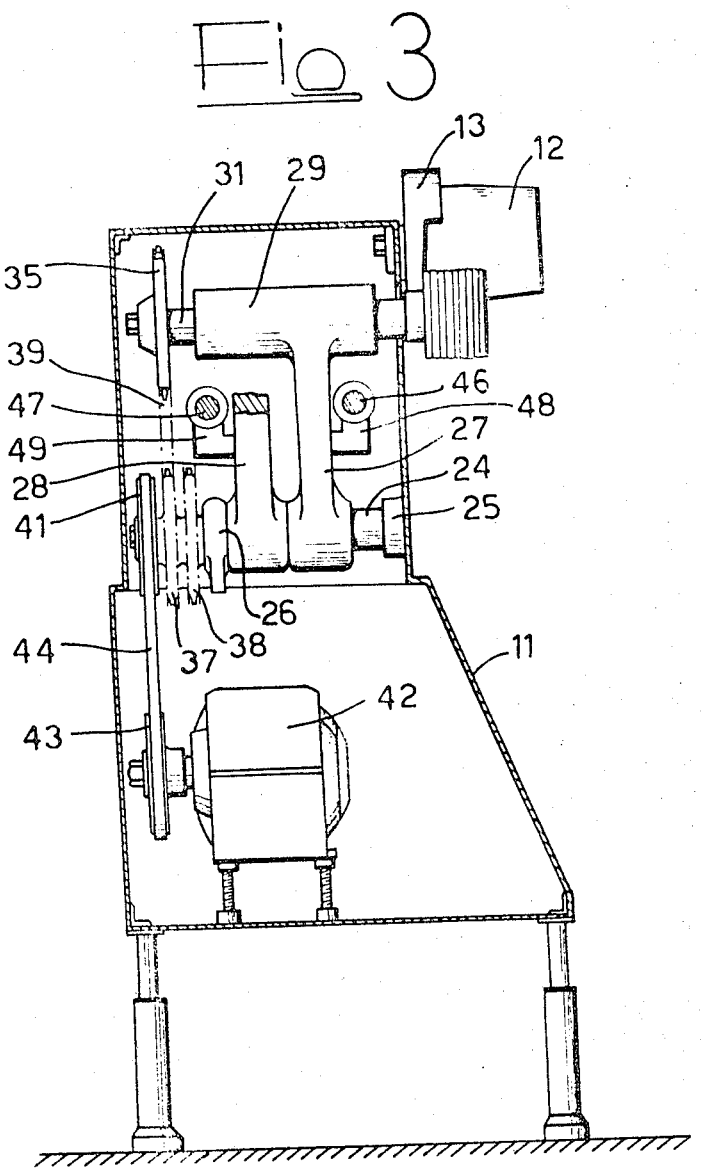

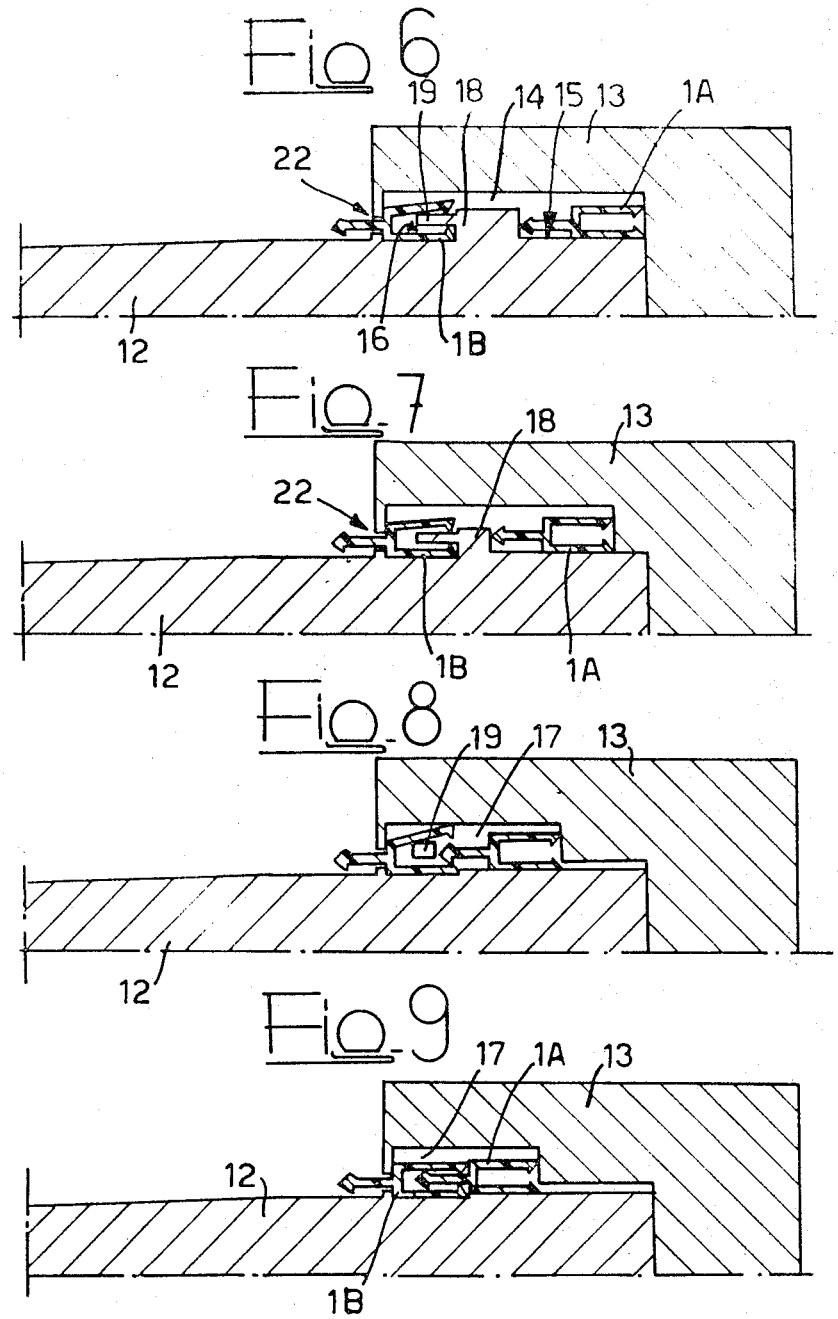

United States Patent Office 3,300,812
Patented Jan. 31, 1967

3,300,812
MACHINE FOR MANUFACTURING
FLEXIBLE TUBING
Glauco Pasquetti, 103 Via Sanvito Silvestro,
Varese, Italy
Filed June 14, 1965, Ser. No. 463,602
Claims priority, application Italy, Jan. 25, 1965,
2,089/65
5 Claims. (Cl. 18—12)

This invention relates to machines for manufacturing tubing from a profile of plastics, which is formed with a continuous longitudinal channel adapted to receive a longitudinal bead on the web.

Known machines for manufacturing tubing from a profile of the abovementioned type gradually wind the profile to a cylindrical helix and simultaneously force the last convolution being formed in the helix against the previously formed convolution in order to cause the bead on the last convolution to snap into the channel in the preceding convolution.

Whenever a deformation in the profile during forcing causes the bead to slip out the channel, the bead will further keep out thereof, which results in failure to interconnect the convolutions and form the tubing.

Tubing machines of known type are further objectionable in that the bead is engaged by the channel by mutual forcing, breakage often occurs in the bead and channel, which impairs tightness of the tubing.

In order to obviate the above drawbacks this invention provides a machine for manufacturing tubing by the above mentioned general process, comprising a drum fixed to the machine frame having externally two substantially helical passages arranged side by side, adapted to guide two portions of the web which are brought close to each other on helically winding of the profile about the drum, the said passages converging to form a single passage of a decreasing width smaller throughout its length than twice the profile width, at least one roller keyed to a driving shaft parallel with the drum axis and movable with respect to the latter, means for displacing the said driving shaft to move the roller into adjustable pressure contact with the drum, or remove it therefrom, and means arranged in the passages adapted to resiliently expand the channel in a profile portion engaged by one passage to allow free insertion of the bead on another profile portion engaged by the other passage.

Further characteristic features and advantages of this invention will be understood from the appended detailed description referring to the accompanying drawings which show an embodiment thereof, by way of example.

Figure 5:
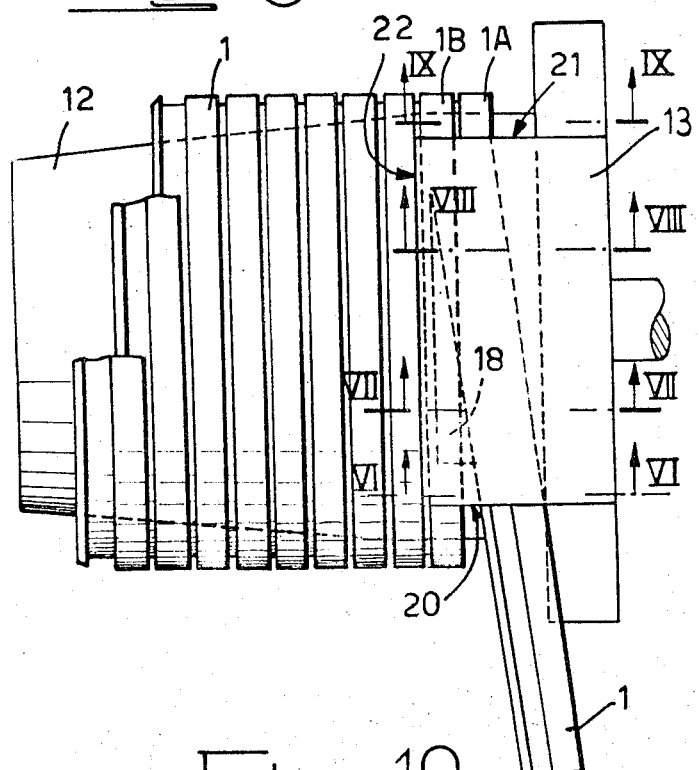
Figure 10:
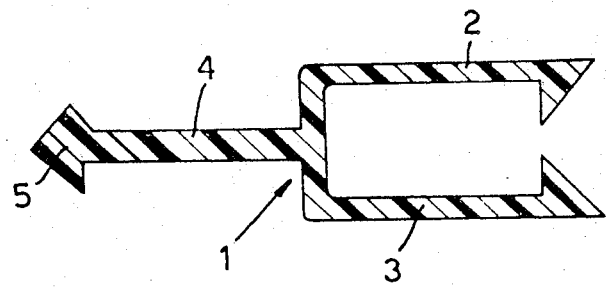

FIGURE 1 is a perspective view of the machine according to this invention,
FIGURE 2 is a view along the arrow Y of FIG. 1,
FIGURE 3 is a sectional view on line III—III of FIGURE 2,
FIGURE 4 is an enlarged sectional view on line IV—IV of FIGURE 2,
FIGURE 5 is a view along the arrow X of a detail of FIGURE 1,
FIGURES 6 to 9 are sectional views on lines VI—VI, VII—VII, VIII—VIII and IX—IX of FIGURE 5,
FIGURE 10 is an enlarged cross sectional view of a profile of plastics employed for manufacturing a tubing by the machine according to this invention.
FIGURE 11 is a diagrammatical view of a plant for manufacturing tubing of plastics employing a machine according to this invention.

Referring to FIGURE 10, the profile comprises in cross section a shank 4 having at one end an enlarged head portion 5.

The other end of the shank 4 is integral with a tine section comprising two limbs 2, 3 ending by hook portions turned towards each other.

The head portion 5 forms in the profile a continuous longitudinal bead, the limbs 2, 3 forming in the profile 1 a continuous longitudinal channel adapted to receive the longitudinal bead on helical winding of the profile.

The machine according to this invention comprises a frame 11 supporting an overhanging cylindrical drum 12 arranged with a horizontal axis secured thereto.

The free end of the drum 12 is tapered in order to facilitate axial movement of the tubing formed in the manner to be explained hereafter.

The drum 12 externally carries on its cylindrical portion a curved apron 13 defining with the drum a curved clearance 14 having its axis of curvature coinciding with the axis of the drum 12.

The clearance 14 is open along two extreme sides 20, 21 of the apron parallel with the drum axis and along a further side 22 orthogonal to the first two mentioned sides 20, 21.

The drum is formed within the clearance 14 with a wedge-shaped rib 18 extending substantially from the side 20 to the side 21 of the apron to form a partition which subdivides the clearance 14 into two passages 15, 16 of substantially helical shape.

The rib 18 decreases in cross sectional area from the side 20 to the side 21 of the apron.

The two passages 15, 16, which are separate at the side 20, converge at the other side 21 to form a single passage 17 smaller in width throughout its length than twice the width of the profile 1.

The passage 17 decreases in width from the location at which the passages 15, 16 converge towards the side 21.

The passages 15, 16 act as lateral guides for two portions of the profile 1 which are brought close on helical winding of the profile about the drum 12, as shown in FIGURE 5.

The rib 18 is provided with a lateral wing 19 overhanging above the bottom of the passage 16 and extending beyond the location at which the two passages 15, 16 converge to form the single passage 17.

The overhang of the wing 19 decreases from the side 20 towards the location at which the passages 15, 16 converge.

Two coaxial bearings 25, 26 fixed to the frame 11 support a shaft 24 which protrudes from the bearing 26.

The common axis of the bearings 25, 26 extends parallel with and beneath the axis of the drum 12.

The protruding end of the shaft 24 has rotatably mounted thereon two toothed wheels 37, 38 and a grooved pulley 41 fast with one another.

Two arms 27, 28 are freely pivoted by their ends to the portion of the shaft 24 intermediate the bearings 25, 26, and have securedly fixed to their other ends two sleeves 29, 30, respectively, the axes of which extend parallel with the drum axis.

The sleeves 29, 30 have rotatably mounted therein two shafts 31, 32 protruding from the sleeves by their opposite ends.

The shafts 31, 32 each carry at one end a toothed wheel 35, 36 and at their other end a rubber-lined roller 33, 34, respectively.

The rollers 33, 34 are located beneath the drum 12 and have their axes extending parallel with the drum axis.

The arms 27, 28 each have secured thereto a helically toothed sectors 48, 49, having meshing therewith a worm 46, 47, driven by a handwheel 50, 51, respectively.

The helically toothed sectors 48, 49 are coaxial with the shaft 24 so that operation of the handwheels 50, 51 swings the arms 27, 28 about the shaft 24. By acting on the handwheels 50, 51 the rollers 33, 34 can therefore be drawn towards or away from the drum 12.

The toothed wheels 35, 36 are connected to the toothed wheels 37, 38 by means of a chain transmission 39, 40, respectively.

The pulley 41 receives motion through a V-belt 44 from a pulley 43 carried by the shaft of an electric motor 42 secured to the machine frame 11 and provided with a variable speed transmission operable by means of a handwheel 45.

The frame 11 has secured thereto a turnbuckle 52 by which the profile 1 is fed to the drum 12.

After the profile 1 has been slipped at one end into the passage 15 a convolution is formed therefrom about the drum 12 and the leading end of the profile 1 is slipped into the passage 16 and out of the passage 17.

The handwheels 50, 51 are operated to draw the rollers 33, 34 close to the drum 12, in order to press the profile wound about the drum 12 against the outer wall of the latter.

Pressure by the rollers 33, 34 is adjusted by acting on the handwheels 50, 51.

The motor 42 is then started and rotates the rollers 33, 34 whereby the profile is wound about the axis of the drum 12.

The rollers 33, 34 rotate in the same direction such as to cause the convolutions of the profile 1 engaged by the passages 15, 16 and denoted by 1A, 1B, to travel in the direction in which the passages converge.

As the turns 1A, 1B travel within the passages 15, 16, the wing 19 opens the channel on the convolution engaged by the passage 16 to cause the bead on the convolution engaged by the other passage 15 to freely fit into the channel.

The two convolutions 1A and 1B are shown in FIGURES 6 to 9 as they are being inserted by their bead into the channel.

Of course it will be sufficient to press one roller only 33 or 34 against the drum 12 for operation of the machine.

FIGURE 11 diagrammatically shows a plant for manufacturing tubing of plastics by employing a forming machine according to this invention.

The plant comprises a press 53 for hot extrusion of plastics by means of which the profile 1 is obtained, which is fed to the coiling machine according to this invention, denoted by 54, by a pair of feed rollers 56.

A cooling device is interposed between the press 53 and the pair of feed rollers 56, through which the profile 1 issuing from the press 53 travels.

The tubing being formed by the coiling machine 54 is supported by a stand 57 provided with two parallel rows of rollers 58 which hold the tubing axis straight and allow of the tubing to revolve about its axis.

What I claim is:

1. Machine for manufacturing flexible tubing from a profile of plastics formed with a longitudinal channel adapted to receive a longitudinal bead on the profile, wherein the machine comprises a drum supported by the machine frame and having on its circumference two substantially helical passages arranged side by side, adapted to guide two portions of the profile brought close by helically winding the profile about the drum, the passages being separate at one end and converging at their other end to form a single passage smaller in width throughout its length than twice the width of the profile, one roller at least mounted on a driving shaft extending parallel with the axis of the drum and movable with respect to the said axis, means for moving the said driving shaft to bring the roller into adjustable pressure contact with the drum, or remove it therefrom, and means arranged in the passages, adapted to resiliently expand the channel on a profile portion engaged by one passage to permit insertion of the bead on another profile portion engaged by the other passage into the channel.

2. Machine as claimed in claim 1, wherein the machine comprises a curved apron surrounding the drum and forming with the latter a curved clearance having its axis of curvature coinciding with the axis of the drum the clearance being open along two sides of the apron parallel with the drum axis and along a further side of the apron orthogonal to the first two mentioned sides, the two converging passages and the single passage being formed in the said clearance in a direction substantially from one side to the other side of the clearance.

3. Machine as claimed in claim 1, wherein the two converging passages are separate by a wedge-shaped rib having a lateral wing adapted to fit into the channel in the profile, the wing overhanging above the bottom of one passage and extending beyond the location at which the two passages converge to form the single passage, the overhang of the wing decreasing in the direction in which the two passages converge.

4. Machine as claimed in claim 1, wherein the machine comprises two rollers each mounted on a driving shaft extending parallel with the axis of the drum and movable with respect to the said axis to move the rollers into adjustable pressure contact with the drum, or remove them therefrom, the driving shafts rotating in the same direction.

5. Plant for manufacturing tubing from plastics employing the coiling machine as claimed in claim 1, wherein the plant comprises a press for hot extrusion of plastics forming the profile which is fed to the coiling machine, a pair of feed rollers supplying the profile to the coiling machine and a cooling device arranged between the extrusion press and pair of feed rollers, the profile issuing from the press being caused to travel through a cooling device.

References Cited by the Examiner

UNITED STATES PATENTS

| | | | |
|---|---|---|---|
| 1,117,684 | 11/1914 | Murtrie | 29—202.5 |
| 2,137,887 | 11/1938 | Abbott | 18—13 X |
| 2,607,939 | 3/1954 | Eberhard et al. | 18—12 X |
| 2,728,104 | 12/1955 | Fisch | 18—12 X |
| 2,832,096 | 4/1958 | Kramer et al. | 18—19 X |
| 2,994,104 | 1/1961 | Mittag | 156—195 |
| 3,173,172 | 3/1965 | Pasquetti | 29—200 |
| 3,207,827 | 9/1965 | Kuehnle | 18—12 X |
| 3,219,738 | 11/1965 | Olson | 264—173 |

WILLIAM J. STEPHENSON, *Primary Examiner.*